United States Patent [19]
Stone

[11] 3,902,744
[45] Sept. 2, 1975

[54] PREFABRICATED DOUBLE-WALLED METAL CHIMNEY

[75] Inventor: Richard L. Stone, Los Altos Hills, Calif.

[73] Assignee: Wallace-Murray Corporation, Belmont, Calif.

[22] Filed: Apr. 1, 1974

[21] Appl. No.: 457,119

[52] U.S. Cl............. 285/47; 285/133 R; 285/286; 285/367; 285/373
[51] Int. Cl.² .......................................... F16L 39/04
[58] Field of Search..... 285/47, 424, DIG. 5, 133 R, 285/112, 373, 419, 133 A, 367, 369, 187, 286; 138/149

[56] References Cited
UNITED STATES PATENTS

| | | | |
|---|---|---|---|
| 2,362,557 | 11/1944 | Jahns | 285/47 |
| 2,451,587 | 10/1948 | Taylor | 285/112 |
| 2,761,949 | 9/1956 | Colton | 138/149 X |
| 2,930,407 | 3/1960 | Conley et al. | 138/149 X |
| 3,146,005 | 8/1964 | Peyton | 285/133 R X |
| 3,170,544 | 2/1965 | Kinkead et al. | 285/47 |
| 3,574,357 | 4/1971 | Alexandru | 285/47 |

Primary Examiner—Thomas F. Callaghan
Attorney, Agent, or Firm—Owen, Wickersham & Erickson

[57] ABSTRACT

A prefabricated metal chimney formed of a plurality of double-walled sections which can be assembled in axial alignment so that the inner pipe is substantially air or smoke tight. An outer wall member of each section is spaced outwardly from an inner wall member by a series of circumferentially spaced apart spacer connectors. The inner wall members of adjoining sections have end flanges which engage to form an air tight joint and are held together by an inner band member. An outer band member extends around and covers the gap between outer wall members of adjoining sections.

14 Claims, 5 Drawing Figures

PATENTED SEP 2 1975 3,902,744
SHEET 1 OF 2
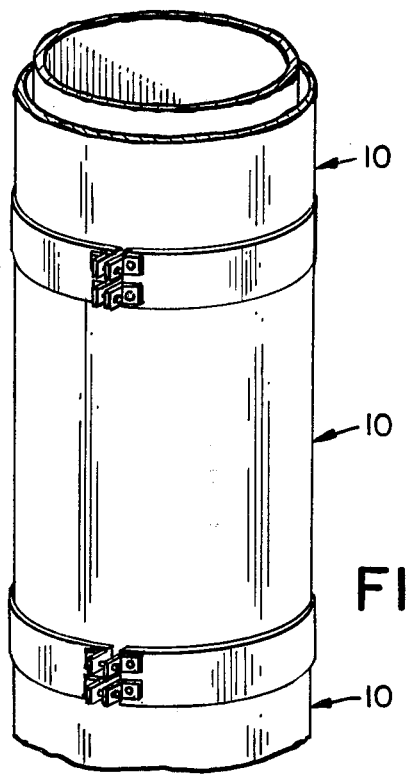
FIG_1
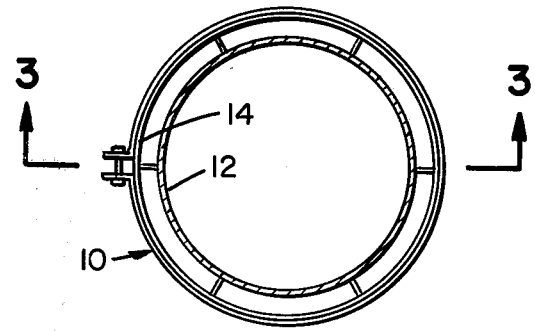
FIG_2
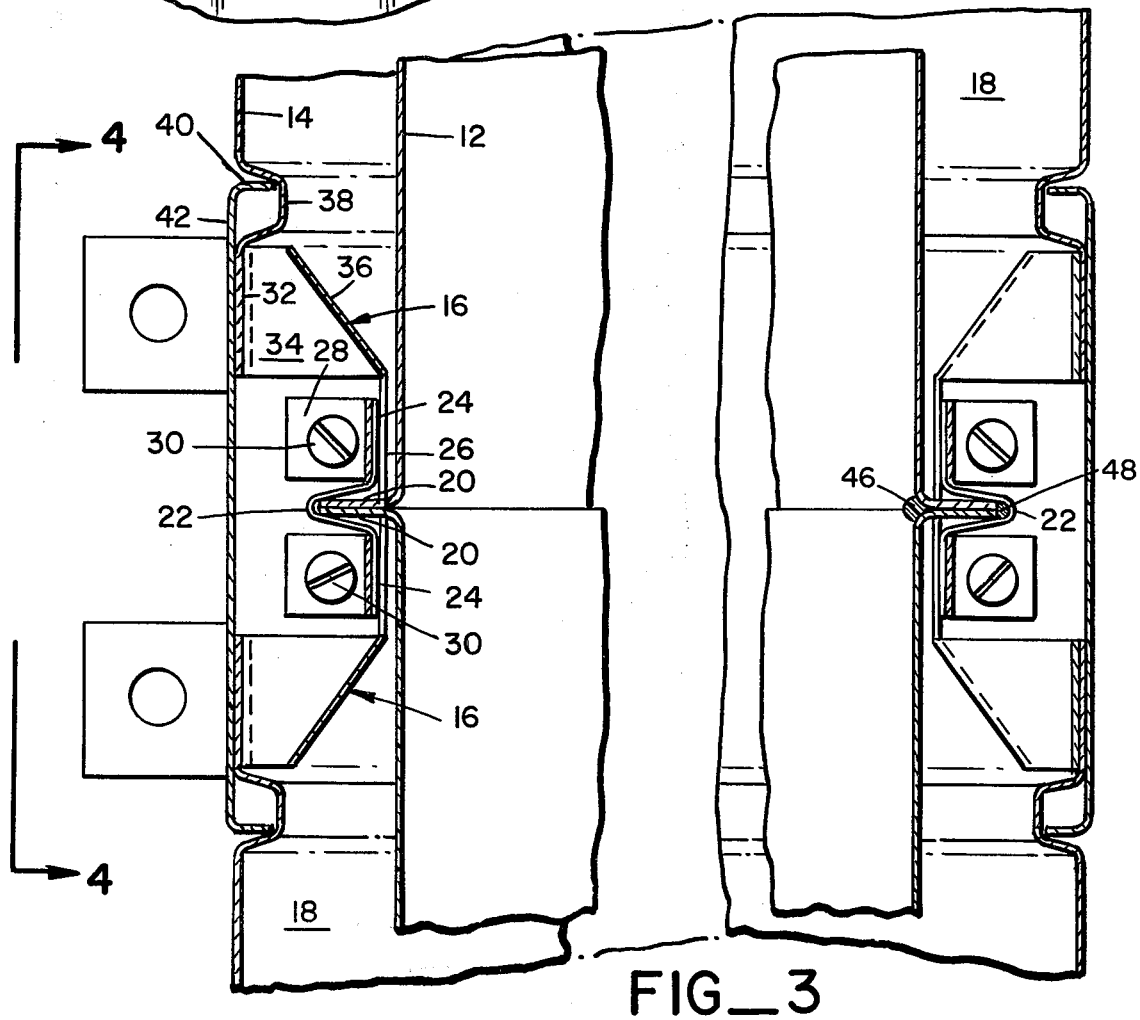
FIG_3

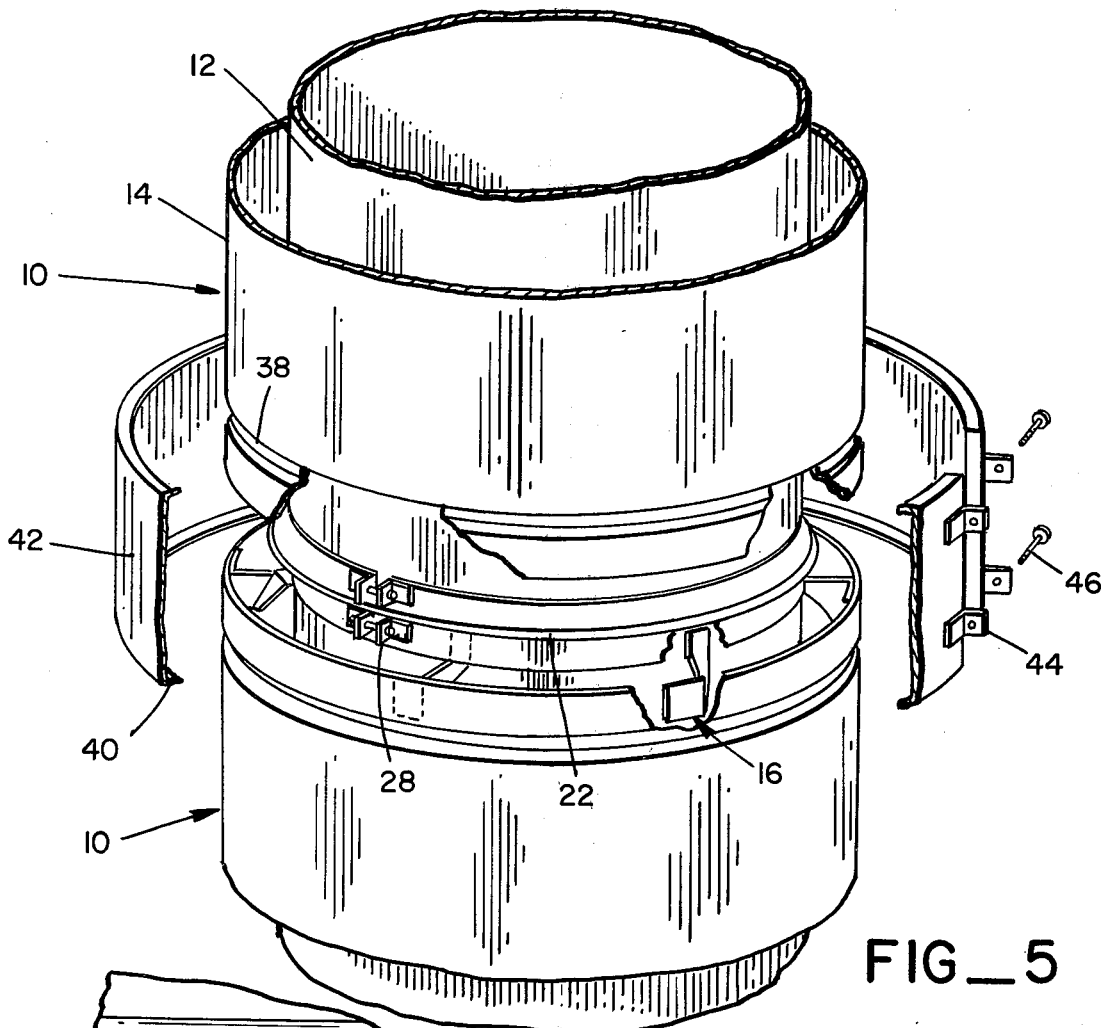
FIG_5
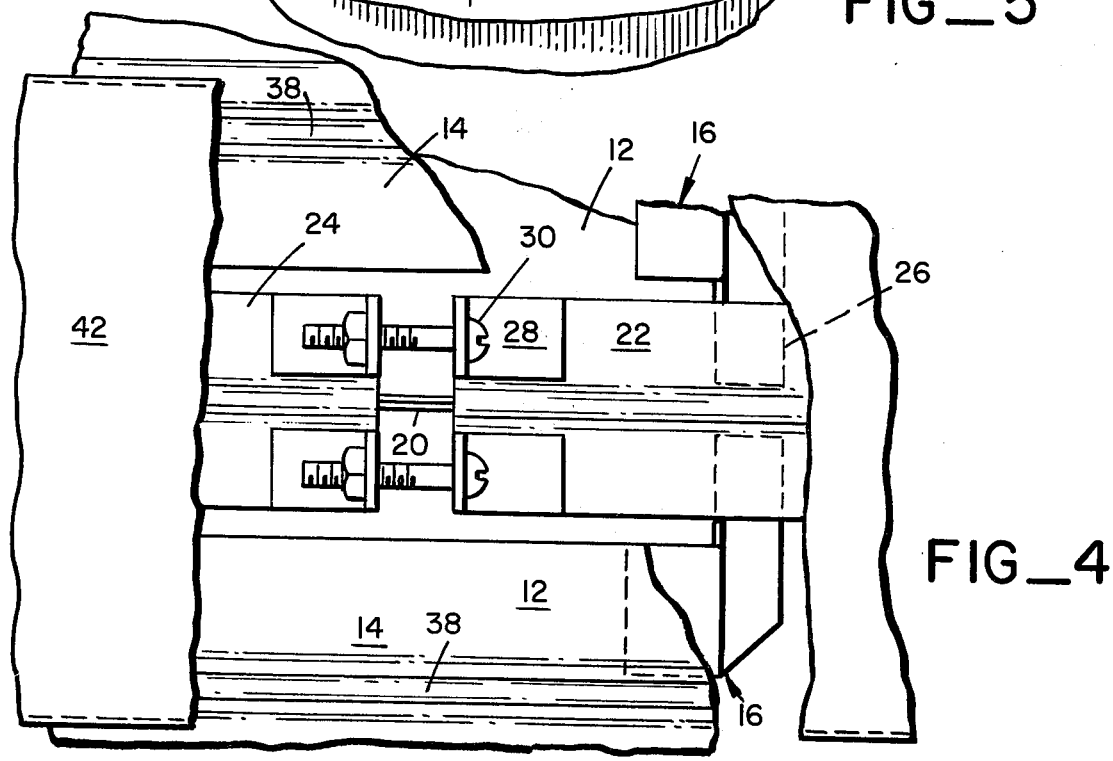
FIG_4

PREFABRICATED DOUBLE-WALLED METAL CHIMNEY

FIELD OF THE INVENTION

This invention relates to an improved prefabricated metal chimney formed from a series of double-walled chimney sections that are connected together in axial alignment.

BACKGROUND OF THE INVENTION

The inherent advantages of prefabricated metal chimneys in providing efficient and economical chimney constructions without the problems and expense of conventional masonry type chimneys have been well established. Metal chimneys heretofore devised have formed by interconnecting a series of prefabricated, double-walled metal chimney sections. One such typical chimney construction which has been commercially successful is described in U.S. Pat. No. 3,170,544. However, in the aforementioned chimney as in all other such prefabricated chimney constructions known to applicant, the inner walls of adjacent, connecting sections did not provide a smoke-tight joint and therefore it was possible for some smoke or gas leakage to occur from the flue passage to the outer wall of the chimney and even out of the chimney. This created several problems in certain situations relating to corrosion, heat loss from the flue, over-heating of the outer wall and general lack of operating efficiency. Prior to the present invention, those skilled in the art failed to devise a chimney construction wherein chimney sections could be readily connected together in alignment so as to form a flue with an essentially smoke or gas tight inner wall. The present invention solves this problem.

It is therefore a general object of the present invention to provide an improved double-walled prefabricated metal chimney comprised of connectable sections which form an air or gas tight inner wall.

Another object of the present invention is to provide a prefabricated metal chimney having a relatively high degree of compressive strength so that chimneys of considerable height can be erected without an excessive amount of supporting structure.

Another object of the present invention is to provide a prefabricated metal chimney that is well adapted for use with any gas carrying product because it will function reliably under neutral, negative or high positive pressure conditions.

Another object of the present invention is to provide a prefabricated metal chimney comprised of connectable sections having non-ferrule type joints so that the sections can be connected without any relative axial movement, one section can be easily removed and replaced without dismantling the entire chimney.

Still another object of the present invention is to provide a prefabricated metal chimney comprised of connectable sections which are constructed so as to provide relatively low rate of heat loss compared with prior art chimney structures.

Yet another object of the invention is to provide an improved double-walled prefabricated chimney construction wherein the inner wall is completely sealed and is spaced from the outer wall by spacer connectors, thereby preventing all but a relatively small amount of heat flow by conduction from the inner wall to the outer wall.

Another object of the invention is to provide double-walled conduit sections that are connectable to form a chimney in such a manner that the inner walls of the conduit sections are able to expand at a different rate than the outer walls, thereby allowing the chimney comprised of such sections to undergo temperature cycles without mechanical damage.

Another object of the present invention is to provide a prefabricated metal chimney which takes maximum advantage of the insulating air space between inner and outer walls to eliminate condensation of moisture on chimney flue interior surfaces, and to prevent gases containing such moisture from escaping through the joints, thus minimizing the problems of condensation, corrosion and deterioration from the inner surface of the outer jacket.

Another object of the present invention is to provide a prefabricated metal chimney, having an inner pipe with circumferential flanged joints, the outermost edges of which may be factory or field welded to form long lengths of flange-reinforced sheet metal conduit for conveying gases without leakage at the maximum operating temperature of the metal alloy employed.

Another object of the present invention is to provide a prefabricated metal chimney, the joints of which are readily sealable so as to be pressure tight by the use of silicone or ceramic sealant placed on mating flanges, or placed within a V-shaped inner band around the flanges at the time of field installation of the chimney in a building.

Other important objects of my invention are to provide prefabricated metal chimney sections that: are unusually strong and durable; are easy to assemble into a chimney structure of a desired height; provide an insulating space between double walls which reduces heat losses and increases flue efficiency; and which are particularly well adapted for ease and economy of manufacture using readily available materials.

BRIEF SUMMARY OF THE INVENTION

The aforesaid and other objects of the invention are accomplished by utilizing chimney sections comprised of a cylindrical inner metal liner with a radially extending flange at each end. A shorter outer liner is concentric with and spaced outwardly from the inner liner. A series of circumferentially spaced apart spacer connectors are fixed to the inner surfaces of the outer liner at their outer ends, and these connectors have tab portions at their inner ends that lie parallel to but spaced slightly away from the outer surface of the inner liner. When two aligned chimney sections are connected together their end flanges are brought into engagement and are retained circumferentially by an annular inner band having a V-shaped cross section and annular flanges that extend around the adjoining inner liners while covering the tab portions of the spacers. When the inner band is tightened, its V-shaped portion holds the adjacent flanges of the inner liners on adjoining sections together to form essentially an air or smoke tight joint. An outer band has upper and lower edge flanges that fit within grooves formed circumferentially in the outer liners of adjoining sections and means to draw the ends of the band together. While tightening of the outer band is not intended to provide an air tight closure between the outer liners of adjoining chimney sections, it serves to close the gap between them and provide additional strength and rigidity to an assembled chimney.

When in use, the joints between adjacent chimney sections provide for a substantially smooth inner flue passage with no passages for leakage of hot gases or smoke to the space between the inner and outer liners. Thus, a clean layer of air surrounds the inner pipe and provides the necessary insulation and cooling factors for most conditions.

Other objects, advantages and features of the invention will become apparent from the following detailed description of one preferred embodiment which is presented in conjunction with accompanying drawing:

BRIEF DESCRIPTION OF THE DRAWING

FIG. 1 is a fragmentary view showing a portion of a metal chimney embodying the principles of the present invention;

FIG. 2 is a cross-sectional view of the chimney of FIG. 1;

FIG. 3 is an enlarged fragmentary view in elevation and in section taken at line 3—3 of FIG. 2;

FIG. 4 is a view in section taken at line 4—4 of FIG. 3; and

FIG. 5 is a view in perspective of a portion of a chimney according to the present invention with portions broken away and with the outer band partially removed to expose the joint between sections.

DETAILED DESCRIPTION OF EMBODIMENT

With reference to the drawing, FIG. 1 shows a section of a double-walled conduit formed of connected sections 10 embodying the principles of the present invention. The conduit is particularly adaptable for use as a prefabricated metal chimney in residential and commercial buildings, factories and other structures. As shown in FIGS. 2 and 3, each section is comprised of an inner wall member 12 that is constructed so that it can form an air-tight joint with a similar inner wall member of an adjacent section. The inner wall member is preferably formed from a relatively thin sheet metal such as sheet steel which can vary in thickness depending on the size of the conduit (e.g. from 0.025 inches for a diameter of 10 to 24 inches to 0.045 inches or heavier for a conduit diameter of 38 – 48 inches or larger). Normally, the sheet metal is formed in a cylindrical shape and joined at its edges axially by a lock seam or by welding. An outer wall member 14 of a larger diameter and formed in a similar manner as the inner wall member is attached to and spaced outwardly from the inner wall member by a series of spacer-connectors 16 which are circumferentially spaced apart between the two wall members. These connections maintain an annular insulating space 18 between the wall members 12 and 14 which contain air or which may be filled with some suitable insulating material.

The inner wall member 12 of my conduit section 10 is provided with radially extending end flanges 20 at its opposite ends, and when two such sections are connected together, as for example, when forming a prefabricated chimney, these end flanges 20 of adjacent and aligned sections are brought into flush engagement, as seen in FIG. 3. An inner retaining band 22 having a central portion with V-shaped cross-section fits over the edges of the engaged end flanges 20. The joints formed by these engaged end flanges are readily sealable to be pressure tight by the use of silicone or ceramic sealant placed on the flanges or within the V-shaped cross section of the inner band or in both locations, as indicated by the numeral 46 in FIG. 3, when the sections are installed as a chimney, for example, in a building.

For some conduit installations using the sections 10, the outermost edges of the engaged flanges 20 at each joint may be factory or field welded as indicated by numeral 48 in FIG. 3. This will provide added strength for extra long lengths of relatively large diameter flange reinforced sheet metal conduit, particularly where it is desired to convey gases without leakage at the maximum operating temperature of the metal alloy employed.

Projecting from the central vee portion of the band 22 are integral cylindrical edge portions 24 that extend circumferentially around the adjacent inner wall sections. These latter portions 24 also pass around and are adjacent to the inner end portions 26 of all of the spacer clips 16. The band 22 preferably extends almost completely around the abutting flanges 20 of adjacent inner wall members 12. At the ends of the inner band on each of its edge portions are angle members 28 with radially extending tab portions. These angle members may be welded to or otherwise attached to the band, or they may be an integral part of it, if desired. Conventional machine screws 30 extending through aligned holes in these tab portions are used to draw the ends of the band together and tighten it around the adjoining inner wall flanges 20. With a relatively small amount of take-up on the screws, the band can be drawn tight, thereby pressing these inner wall flanges firmly together and forming a gas-tight seal on the inner wall of the conduit.

The spacer-connectors 16, as shown in FIGS. 3 and 4, are preferably made from sheet material and each has an outer flange portion 32 which is fixed to the inside surface of the outer wall member 14 by suitable fastening means such as spot welding or rivets. On one side edge of the flange 32 is a web portion 34 that extends at roughly a right angle therefrom and radially inwardly toward the inner wall member 12. This web portion is cut at an angle along one side and extending from this latter side is an inner flange 36 which provides stiffness to the web. A continuation of this latter flange, bent parallel to the outer flange forms the inner end or tab portion 26 which fits underneath one edge portion 24 of the inner band 22.

As shown in FIG. 3, the inner tab portions 26 of the spacer connectors 16 preferably do not extend inwardly far enough to engage the outer surface of the inner wall member 12. Actually, they are spaced away from the inner wall surface by a small amount (e.g. 0.004 to 0.008 inches). The end edge of each tab portion 26 is closely adjacent to but also spaced somewhat from the inside surface of the inner wall end flange 20. Thus, even when the inner band 22 is tightened so that its edge portions bear against the spacer tabs 26, the latter do not engage the outer surface of the inner wall. This is important because it greatly reduces the amount of conductive heat transfer from the inner wall to the outer wall of each chimney section and thereby prevents the formation of any "hot spots" on the outer wall surface.

Various numbers of spacer connectors can be used, as required, depending on the size of the conduit. For example, in a conduit having a nominal diameter of around 12 inches, 8 spacer connectors are sufficient to provide the strength and rigidity required.

As shown in FIG. 3, the edges of the outer flanges 32 on the spacer connectors may be flush with the end edge of the outer wall member 14. Spaced a short distance (e.g. 1 to 2 inches) from each end edge of an outer wall member is an annular recess or bead 38 that extends inwardly just beyond the ends of outer flanges of the spacer members. These beads on adjacent conduit sections form seats for the circular edge flanges 40 on an outer connecting band 42. When these latter band flanges extend into the beads of adjacent conduit sections, the main web portion of the band 42 lies flush against and bridges the gap between outer wall members of adjacent conduit sections. At the ends of the outer band are radially extending flanges which may be provided by integral portions that are bent outwardly or by angle members 44 that are fastened to the band web portion. As with the inner band, machine screws 46 extending through aligned openings in the angle members are used to tighten the outer band around adjoining conduit sections.

The assembly and installation of a series of conduit sections 10 according to the present invention can be performed rapidly and efficiently with a minimum of time and labor expense. Once the lowermost or end section of the conduit has been secured by a suitable support or tie-down means, the remaining sections required to form an air flow vent, conduit or chimney may be readily attached in succession. Each connection of adjoining sections is accomplished by first bringing the end flanges 20 on the inner wall members 12 of adjacent conduit sections into abutment or flush contact as the two inner wall members are axially aligned. The inner band 22 is placed around the adjoining inner wall members with its V-portion covering the edges of the adjacent flanges 20. As this inner band is tightened by drawing its ends 28 together with the screws 30, the flanges 20 are pressed tightly together in a sealing engagement. With the inner end portions 26 of the spacer connectors 16 located under the cylindrical leg portions 24 of the inner band 22, the tightening of this band also secures the outer wall member 14 to the inner wall member 12 with the uniform annular dead air space 18 between them. Now, the outer band 42 is placed around the outer wall member with its edge flanges 40 extending radially inwardly into the recesses or beads 38 of the adjacent conduit sections. As the screws 46 are tightened to draw the ends of the outer band together the web portion of the outer band fits firmly against the outer surfaces of the adjacent outer wall members thereby increasing strength and rigidity of the conduit joint. The entire installation procedure for each joint can be accomplished in a relatively short period of time by a single workman who need not be highly skilled.

When used as a chimney, the connection of my sections 10 provide an essentially gas-tight inner flue passage. This produces several important advantages heretofore unavailable with prior prefabricated metal chimney structures. One such advantage is that none of the flue gases which are normally at an elevated temperature will pass into the insulating space 18 between the inner and outer conduit walls. Thus, the dead air or insulating material in this space will be more effective in preventing heat transfer to the outer wall member. Also, with the present invention, heat transfer from the inner wall to the outer wall by conduction is kept at a minimum since the only connecting members between the walls are the spaced apart connectors 16 whose inner portions 26 preferably do not engage the inner wall surface. Thus, "hot spots" or areas of heat concentration or buildup on the outer wall 14 is prevented.

Another advantage in preventing any flow of gases from the inner flue formed by the sealed joints of the inner wall to the space 18 between the conduits walls is that corrosive gases cannot contaminate the outer wall member. This greatly enhances the durability of a chimney made from prefabricated sections according to the invention.

Still another advantage of the conduit sections 10 when used in forming a chimney that carries hot flue gases is that the inner wall 12 of each section is free to expand at a different rate than its outer wall 14. As shown in FIG. 3, the outer band 42 abuts the bead 38 at its upper and lower limits, allowing some movement of the band flanges 40 within their respective bead grooves. Similarly, the spacer-connects 16 are not tightly retained by the Vee band 22. Thus, as the inner pipe expands faster than the outer, the inner tab portions 26 can slide relative to the band flange portions 24 and the outer surface of the inner pipe. At the same time, as differential movement occurs when the inner pipe expands more than the outer, the flanges of the outer band 40 can move, as stated above, within their matching beads or grooves. The ability to provide this differential thermal expansion is extremely important since it enables products according to the present invention to undergo temperature cycles without mechanical damage.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A prefabricated double-walled chimney section adapted to be connected to a similar section to form a chimney column, said section comprising:

a cylindrical inner imperforate wall member having a radially extending flange at each end;

a cylindrical outer imperforate wall member having a greater diameter than and spaced outwardly from said inner wall member, said outer wall member being shorter than said inner wall member so that at least one end edge is spaced above the end flange of said inner wall member;

spacer connector means located between said inner and outer wall members near both ends, having an outer end portion fixed to the inside surface of said outer wall member and an axially extending inner end portion located adjacent to but unattached to the outer surface of said inner wall member an inner band means having a flange portion extending around said inner end portion of said spacer connector means and means on the opposite ends of said flange portion for drawing said inner band means tightly around said inner pipe member; and means near said end edge of said outer wall member for retaining a connectable outer band means adapted to extend circumferentially around said outer wall member.

2. The double-walled chimney section of claim 1 wherein said means for retaining said outer band means comprises a circumferential bead forming an annular recess spaced axially from said end edge of said outer wall member.

3. The double-walled chimney section of claim 1 wherein said spacer connector means comprises a plurality of separate spacer connector members located at circumferentially spaced apart intervals between said inner and outer wall members, said outer and inner end portions of said spacer connectors being interconnected by a web portion having a length such that said inner end portion of each connector is spaced outwardly a small but substantially uniform distance from and thereby avoiding actual contact with the outer surface of the inner wall member and minimizing the flow of heat therefrom to the outer wall member.

4. The double-walled chimney section of claim 1 wherein said inner band means has a central V-shaped portion which fits around the outer edges of adjoining end flanges on adjacent chimney sections to thereby hold them tightly together when the inner band means is tightened, and flange portions extending axially from the edges of said central V-shaped portion which extend around said inner end portion of said spacer connector means.

5. A prefabricated double-walled metal chimney comprised of a plurality of connected chimney sections, each section comprising:
   a cylindrical inner wall member having a radially extending flange at each end engaging a like flange of an axially aligned inner wall member of an adjoining chimney section;
   a cylindrical outer wall member for each section having a greater diameter than and spaced outwardly from said inner wall member, said outer member being shorter than said inner wall member for each said section so that its ends are spaced axially above and below the said end flanges of said inner wall member;
   spacer connector means located between said inner and outer wall members near both ends of each said section, said connector means having an outer portion fixed to said outer wall member and an axially extending inner portion located adjacent to but unattached to the outer surface of said inner wall member;
   an inner band extending around each pair of adjoining end flanges of adjacent connecting sections and also around said inner end portion of said spacer connector means, and means for tightening said inner band to form a substantially gas tight joint between said end flanges; and
   an outer band extending around the outer wall members of adjoining sections for closing the gap between adjoining sections.

6. The chimney as described in claim 5 wherein each said spacer connector means comprises a plurality of connector members each having an outer end portion fixed to said outer wall member and an inner end portion located adjacent to the outer surface of said inner wall member, said inner end portions being engaged by and urged toward said inner wall member by said inner band.

7. The double-walled chimney section of claim 5 wherein said outer and inner end portions of said spacer connector means are interconnected by a web portion having a length such that said inner end portion of each connector means is spaced outwardly a small but substantially uniform distance and thereby avoiding actual contact with the outer surface of the inner wall member, thereby minimizing the conductive flow of heat therefrom to the outer wall member.

8. The double-walled chimney section of claim 5 wherein said inner band means has a central V-shaped portion with flange portions extending from its edges which fits around the outer edges of adjoining end flanges on adjacent chimney sections to thereby hold them tightly together when the inner band means is tightened.

9. The double-walled chimney section of claim 5 wherein said outer wall member on each said section has annular recesses spaced from its opposite end, said outer band comprising a web portion that fits flush against the outer surface of the outer wall members of adjoining sections with flange portions which extend radially inwardly into said annular recesses.

10. A double-walled metal conduit comprised of a series of prefabricated sections connected together in end to end alignment, said sections each comprising:
   a cylindrical inner imperforate wall member having a radially outwardly extending flange at each end, said flanges of adjoining sections being flush together and secured thereto;
   a cylindrical outer imperforate wall member having a greater diameter than and spaced outwardly from said inner wall member, said outer wall member being shorter than said inner wall member so that at least one end edge thereof is spaced above the end flange of its said inner wall member, said outer wall members of adjoining sections being spaced apart;
   a spacer connector means located at circumferentially spaced apart intervals between said inner and outer wall members at opposite ends of each said section, each said spacer connector means having an outer end portion fixed to the inside surface of said outer wall member and an axially extending inner end portion located adjacent the outer surface of said inner wall member and its said end flange;
   a circumferential recess located near said end edge of each said outer wall member; and
   a connectable outer band means retained in said recess and extending circumferentially around said outer wall members of adjacent aligned sections.

11. The double-walled conduit of claim 10 including an inner band means for each pair of adjoining sections having a flange portion extending around the inner end portions of said spacer connectors and means on the opposite ends of said flange portion for drawing said inner band means tightly around adjacent inner pipe members.

12. The double-walled conduit of claim 11 wherein said inner band means has a central V-shaped portion which fits around the outer edges of adjoining end flanges on adjacent chimney sections to thereby hold them tightly together when the inner band means is tightened and axially extending flange portions extending from the said central V-shaped portion which extend around and retain said inner end portion of said connector means.

13. The double-walled conduit of claim 10 including sealant means on the mating radially extending flanges of adjacent conduit sections, thereby assuring an airtight inner passage in said conduit.

14. The double-walled conduit of claim 10 including weldments for permanently connecting the mating radially extending flanges of adjacent conduit sections.

* * * * *